Nov. 12, 1935.   J. S. OGG   2,020,697
PNEUMATIC DISPATCH SYSTEM
Filed Feb. 12, 1932
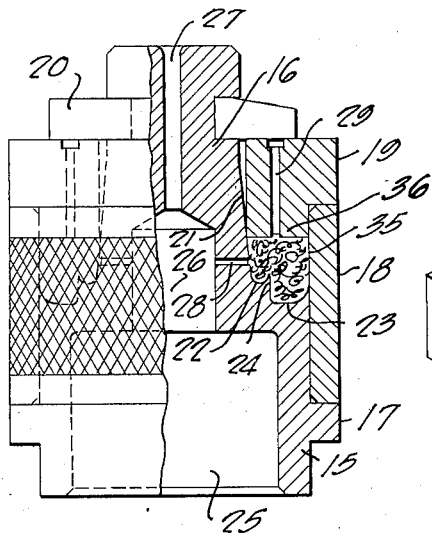
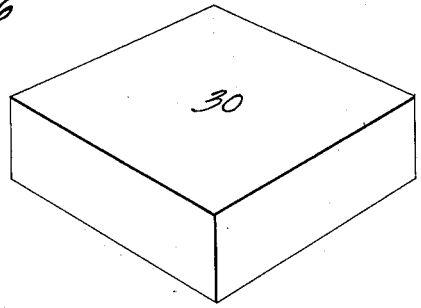
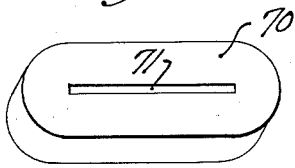
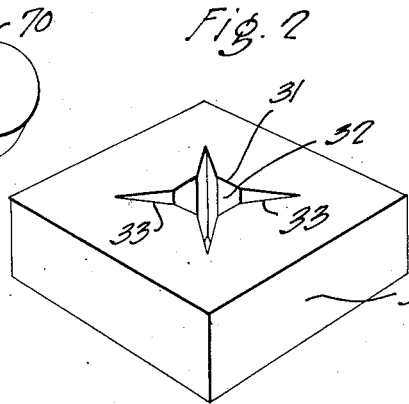
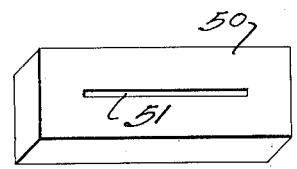
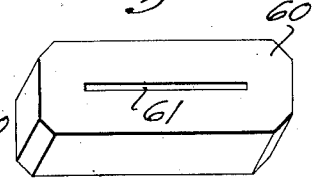
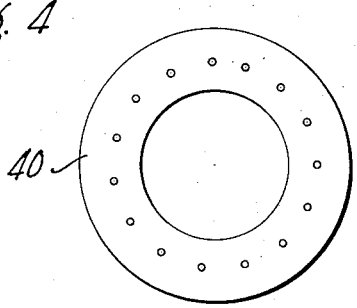
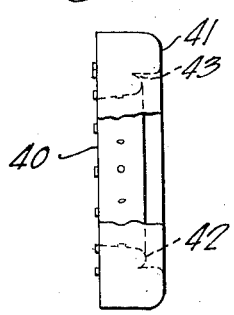
INVENTOR
JOHN S. OGG
by Roberts, Cushman & Woodberry
ATTYS Patented Nov. 12, 1935

2,020,697

UNITED STATES PATENT OFFICE 2,020,697

PNEUMATIC DISPATCH SYSTEM

John S. Ogg, Syracuse, N. Y., assignor to The Lamson Company, Syracuse, N. Y., a corporation of Massachusetts Application February 12, 1932, Serial No. 592,536

7 Claims. (Cl. 18—55)

This invention relates to an improvement in pneumatic dispatch system and more particularly to felt heads which are secured to the heads of the pneumatic dispatch carriers in the well known manner, and to the method of making such heads.

Heretofore it has been the practice to make such felt rings by cutting the center from a disk of felt. Such procedure is wasteful since the removed center of the disk has little or no use. Furthermore in forming the disk from a block of felt it is also necessary to trim off the corners and such trimmings are of no value.

One object of the present invention is to provide a method for making a felt ring from a block of felt without the necessity of removing and discarding any of the felt. Another object of the invention is to provide an annular felt head made from a block of felt, which head includes all the felt in the block from which it was made.

Other objects will appear from the examination of the following description of the invention and the drawing which forms a part thereof, and in which Fig. 1 is a perspective view of a block of felt from which a felt head for a pneumatic dispatch carrier in accordance with this invention may be made;

Fig. 2 is a similar view of such block of felt after the first operation has been performed;

Fig. 3 is a side elevation with parts broken away, of an apparatus in which the felt, after being treated as shown in Fig. 2, is subjected to heat, pressure and moisture;

Fig. 4 is a plan view of a felt head made in accordance with this invention;

Fig. 5 is a side elevation of such head, the parts being broken away; and

Figs. 6, 7 and 8 are views similar to Fig. 2 illustrating felt blocks of other conformations after the center has been perforated and from which the heads shown in Figs. 4 and 5 may be made.

The apparatus used in the treatment of the felt is preferably that disclosed in the copending application of Fred R. Taisey, filed February 12, 1932 under Serial No. 592,537. Such apparatus comprises a mold 15 having a single post 16 and an annular shoulder 17 upon which rests a separate sleeve 18, a cap 19 which, at the conclusion of the treatment, rests upon the sleeve 18 and a key 20 by which the cap is secured in such position. The post 16 is in part conical having a tapered wall portion 21 which terminates in an annular pocket 22 in the mold 15. A second annular pocket 23 surrounds the first-mentioned pocket and is separated therefrom by an annular wall 24. The mold 15 is hollow having a large central chamber 25 at the bottom, a smaller chamber 26 which leads from the chamber 25 and a plurality of passages 28 which radiate from the chamber 26. In the cap 19 are formed a plurality of vertical passages 29.

The felt head may be formed from a rectangular felt block 30 shown in Fig. 1, in which the upper and lower faces are square and parallel and the sides defining such faces are uniform. The block 30 is perforated at its center through the upper and lower faces by a suitable tool which will give an opening preferably of the four pointed star conformation indicated by the reference number 31 in Fig. 2, which opening comprises a central portion 32 and portions 33 radiating from the portion 32 toward the corners of the block. It will be understood that the block of felt is at this time fairly rigid but still can be stretched or compressed and that the opening 31 can be formed without removing any of the felt.

The perforated block previously moistened either with hot or cold water or with steam to render it flexible and easily manipulatable is then slipped over the post 16 of the mold, the cap 19 and key 20 having been removed and forced down until it rests upon the wall 24. During this operation, of course, the central opening 31 is enlarged and at the same time the corners which would project beyond the sleeve 18 are pushed back so that the entire block is within the confines of the recess 35 defined by the post 16 and the sleeve 18. The cap 19 is then slipped over the post 16 and the projection 36 at the lower face of the cap rests on the upper face of the block of felt 30. Pressure is then applied by a press or otherwise as the case may be until the cap 19 rests upon the sleeve 18 and the felt has been forced down to fill the annular recess 35 defined by the walls of the mold 15 and the sleeve 18 and the annular pockets 22 and 23. The cap 19 is then secured in position by the use of the key 20 in the usual manner. Under this pressure the felt is compacted and some of the moisture therein escapes through the radial passages 28, and the vertical passages 29 in the cap. After drying in any suitable manner, the head 40 formed from the ring, as shown in Figs. 4 and 5, is now ready for application to the carrier head in the usual manner.

The head has at one face, a curved annular portion 41 and a second curved annular portion 42 surrounded by the portion 41 and separated therefrom by a recess 43. This particular conformation of the head is due of course to the provision of the pockets 22 and 23 in the mold 15 of the apparatus used in carrying out the latter part of the method—and it will be understood that I am not limited thereto since the invention to which this application is directed comprises the preliminary perforating of the block of felt and the compressing of such felt into an annular head by any suitable mechanism or instrumentality.

In place of perforating the block of felt the central portion thereof may, if desired, be entirely removed with a punch of suitable conformation and hence the term "perforating" is used herein to mean making a hole in the block either by separating the material or by removing a portion thereof. The four pointed star conformation here shown was selected because of the particular form of the block of felt to be treated, but as pointed out below, blocks of felt of other forms might be used and would require a different conformation of the perforation.

Figs. 6, 7 and 8 illustrate other forms of blocks, each of which has a central perforation and which, after the treatment in forming the apparatus disclosed in Fig. 3 previously described, will form the felt heads shown in Figs. 4 and 5.

The upper and lower faces of the blocks 50 (Fig. 6) are rectangular and the perforation 51 is parallel to and equally from the long sides thereof. The block 60 (Fig. 7) differs from the block 50 in that the corners are removed, the perforation 61 being similar to the perforation 51. Fig. 8 illustrates a further development of the same idea, the shorter sides being completely rounded so that the upper and lower faces of the block 70 are ovate and the perforation 71 being on a center line parallel to the longer sides.

In place of moistening the blocks with water or steam as suggested above, sizing, cementing or binding mixtures may be used, and in fact such mixtures are desirable since the moisture has a tendency to dissolve or otherwise weaken the action of the binder in the felt. Furthermore, while the perforation through the block has been shown and described as central, it may be other than central should the occasion arise, and yet be within the bounds of the invention.

Various ways may be employed for drying the felt after the molding operation is completed. Thus the felt under pressure in the mold may be heated, as by placing the mold in an oven, until substantially all the moisture has been driven off, or by subjecting it to a blast of air or both, or the felt after being molded may be removed from the mold and then dried in any well known manner.

While this invention has been described specifically with respect to the manufacture of felt heads for pneumatic dispatch carriers, it is also broadly applicable to many other uses as to the manufacture of bumpers, rings, washers, or in fact many other articles of felt or the like, and although several shapes of blocks which may be formed into felt heads in accordance with this invention have been shown and described, it will be understood that I am not limited thereto, since blocks of other shapes might be used, all without departing from the spirit and scope of the invention as set forth in the following claims.

I claim:

1. That method of making a felt ring from a block of felt which comprises the steps of perforating the block to form an opening therein, moistening the block, and subjecting the moistened perforated block to the compacting action of heat and pressure whereby the opening is enlarged and the ring is formed.

2. That method of making a felt head for a pneumatic dispatch carrier from a block of felt which comprises the steps of perforating the block to form an opening therein, moistening the block with a suitable binding mixture and concomitantly enlarging the opening and compacting the block into an annular ring by the application of heat and pressure to the perforated block.

3. That method of making a felt head for a pneumatic dispatch carrier from a block of felt having at least two parallel sides, which comprises the steps of perforating the block to form an opening along a line parallel to the parallel sides, moistening the perforated block and concomitantly enlarging said opening and compacting the body of the block into an annular ring by the application of heat and pressure thereto.

4. That method of making a felt head for a pneumatic dispatch carrier from a block of felt having at least two parallel sides, which comprises the steps of perforating the block to form an opening along a line parallel to the parallel sides, moistening the perforated block with a binding mixture and concomitantly enlarging said opening and compacting the body of the block into an annular ring by the application of heat and pressure thereto.

5. That method of making a felt head for a pneumatic dispatch carrier from a rectangular block of felt which comprises the steps of perforating the block at its center to provide an opening of a four pointed star conformation, moistening the perforated block and concomitantly enlarging said opening and compacting the block into an annular ring by the application of heat and pressure to the perforated block.

6. That method of making a felt head for a pneumatic dispatch carrier from a rectangular block of felt which comprises the steps of perforating the block at its center to provide an opening of a four pointed star conformation, each point radiating from the center toward a corner of the block, moistening the perforated block and concomitantly enlarging said opening and compacting the body of the block into an annular ring.

7. That method of making a felt head for a pneumatic dispatch carrier from a rectangular block of felt which comprises the steps of perforating the block at its center to provide an opening of a four pointed star conformation, each point radiating from the center toward a corner of the block, moistening the perforated block and concomitantly enlarging said opening and compacting the body of the block into an annular ring by the application of pressure and heat.

JOHN S. OGG.